(12) United States Patent
Beltman et al.

(10) Patent No.: US 8,807,331 B2
(45) Date of Patent: Aug. 19, 2014

(54) BELT CONVEYOR WITH AN ACTUATOR FOR MOVING THE BELT IN A LATERAL DIRECTION

(75) Inventors: Arend-Jan Johan Beltman, Best (NL); Albert Brals, Beek En Donk (NL); Ronald Plak, Waarland (NL); Jasper Anne Frido Marikus Simons, Eindhoven (NL)

(73) Assignee: C. C. M. Beheer B.V., Neunen (NL)

( * ) Notice: Subject to any disclaimer, the term of this patent is extended or adjusted under 35 U.S.C. 154(b) by 0 days.

(21) Appl. No.: 13/816,273

(22) PCT Filed: Aug. 3, 2011

(86) PCT No.: PCT/NL2011/050548
§ 371 (c)(1),
(2), (4) Date: Apr. 22, 2013

(87) PCT Pub. No.: WO2012/021059
PCT Pub. Date: Feb. 16, 2012

(65) Prior Publication Data
US 2013/0284567 A1    Oct. 31, 2013

(30) Foreign Application Priority Data

Aug. 12, 2010   (NL) .................................... 2005222

(51) Int. Cl.
| B65G 23/44 | (2006.01) |
| B65G 21/10 | (2006.01) |
| B65G 39/16 | (2006.01) |
| G03G 15/00 | (2006.01) |
| B65G 15/64 | (2006.01) |
| B65H 5/02  | (2006.01) |

(52) U.S. Cl.
CPC .......... *B65G 15/64* (2013.01); *B65H 2404/253* (2013.01); *B65G 39/16* (2013.01); *G03G 15/6567* (2013.01); *B65H 2801/12* (2013.01); *B65H 2404/255* (2013.01); *B65H 2404/252* (2013.01); *B65H 2511/20* (2013.01); *B65H 5/021* (2013.01); *B65G 23/44* (2013.01)
USPC ....... 198/807; 198/806; 198/810.03; 198/813

(58) Field of Classification Search
USPC ............ 198/805, 806, 807, 810.03, 812, 813; 226/179
See application file for complete search history.

(56) References Cited

U.S. PATENT DOCUMENTS

| 2,752,151 A * | 6/1956 | Levine ............................ 226/20 |
| 5,246,099 A | 9/1993 | Genovese |

(Continued)

FOREIGN PATENT DOCUMENTS

| AT | 375327 B | 7/1984 |
| CN | 201254384 Y | 6/2009 |

(Continued)

OTHER PUBLICATIONS

Machine English Translation of AT 375327.

(Continued)

*Primary Examiner* — Leslie A Nicholson, III
(74) *Attorney, Agent, or Firm* — Hoffmann & Baron, LLP

(57) ABSTRACT

A positioning assembly is provided with an endless loop conveyor belt for transporting an object and a first and second roller (12) arranged inside the endless loop. A first mounting part connected to a first end of the first roller (12) and a second mounting part connected to a second end of the first roller (12) are independently movable in a length direction of the conveyor with respect to the frame (15). An actuator system is provided which includes a first lateral actuator (61) arranged to move at least a part of the first roller (12) in a direction parallel to the rotational axes (106) of the first roller (12). The first roller (12) is longitudinally divided into at least two longitudinal segments. The first lateral actuator (61) moves at least one of the longitudinal segments parallel to the rotational axis (106) of the first roller (12).

12 Claims, 10 Drawing Sheets

(56) References Cited

U.S. PATENT DOCUMENTS

| | | | |
|---|---|---|---|
| 5,641,058 A * | 6/1997 | Merten et al. | 198/810.04 |
| 5,896,979 A * | 4/1999 | Hokari et al. | 198/807 |
| 6,088,558 A | 7/2000 | Yamada et al. | |
| 6,286,663 B1 | 9/2001 | Hartmann | |
| 6,550,656 B2 * | 4/2003 | Kurz | 226/19 |
| 6,752,261 B1 * | 6/2004 | Gaeddert et al. | 198/861.1 |
| 6,786,325 B2 * | 9/2004 | Powell | 198/807 |
| 2003/0136646 A1 | 7/2003 | Powell | |
| 2005/0139456 A1 | 6/2005 | Kitamura | |
| 2006/0119029 A1 | 6/2006 | Kitamura | |
| 2006/0233578 A1 | 10/2006 | Maki et al. | |

FOREIGN PATENT DOCUMENTS

| | | |
|---|---|---|
| CN | 201283326 Y | 8/2009 |
| DE | 19816466 A1 | 10/1999 |
| EP | 0437203 A2 | 7/1991 |
| EP | 2003512 A2 | 12/2008 |
| FR | 2110382 A1 | 6/1972 |
| WO | WO 2005/109111 A1 | 11/2005 |

OTHER PUBLICATIONS

Machine English Translation of DE 19816466.

Machine English Translation of FR 2110382.

Notification of the First Office Action (in English) for Chinese Application No. 2011800454210, issued Apr. 29, 2014.

English abstract for Chinese Patent No. CN 201254384 Y.

English abstract for Chinese Patent No. CN 201283326 Y.

* cited by examiner

BELT CONVEYOR WITH AN ACTUATOR FOR MOVING THE BELT IN A LATERAL DIRECTION

CROSS-REFERENCE TO RELATED APPLICATIONS

This application is the National Stage of International Application No. PCT/NL2011/050548, filed Aug. 3, 2011, which claims the benefit of Netherlands Application No. 2005222, filed Aug. 12, 2010, the contents of which is incorporated by reference herein.

FIELD OF THE INVENTION

The invention relates to a positioning and/or transfer assembly, such as a high accuracy positioning and/or transfer assembly, comprising a conveyor belt arranged in an endless loop for carrying an object to be positioned; a first and a second roller arranged inside the endless loop; each roller having a first and second end; a mounting for mounting the first and second roller to a frame, the mounting comprising a first mounting part connected to the first end of the first roller and a second mounting part connected to the second end of the first roller; an actuator system for moving the conveyor belt in a lateral direction with respect to the frame.

BACKGROUND

Many positioning and/or transfer assemblies incorporate conveyor belts to transport material or work pieces and position it at a desired location. In those applications a belt is used in the form of a continuous loop which is supported at opposite reversing ends by rollers or the like. The belt might be used for transferring an object from one place to another and/or to position an object on a desired location, for example for processing, treating or machining the object. Proper operation of these systems may require that the belt moves in a controlled way with minimal positioning errors. For example, in inkjet printers each individual color plane is in general transferred to the substrate at different locations along the travel path of the conveyor belt or other substrate carrier. Therefore the position of the object (or substrate as it is called in printing technology) on the conveyor belt needs to be very stable and reproducible, for example within ±10 μm, to insure that the resulting image is of good quality. Position errors of the conveyor belt may cause errors in the positioning of the object that is placed on the conveyor belt.

SUMMARY OF THE INVENTION

A main object of the invention is to improve the position accuracy of a position and/or transfer assembly using a conveyor belt. A further object is to provide a highly accurate—i.e. an assembly with a position accuracy of ≤10 μm—position and/or transfer assembly.

The main object is achieved by providing a positioning and/or transfer assembly comprising:
an endless conveyor belt consisting of a conveying part for carrying an object and a return part;
a first and a second roller arranged inside the endless conveyor belt, each roller having a first and second end;
a frame; and,
a mounting system comprising a first mounting part mounting the first end of the first roller rotatably to the frame, a second mounting part mounting the second end of the first roller rotatably to the frame, a third mounting part mounting the first end of the second roller rotatably to the frame, and a fourth mounting part mounting the second end of the second roller rotatably to the frame; and,
an actuator system for moving the conveyor belt in a lateral direction with respect to the frame, wherein the actuator system comprises a first lateral actuator arranged to move at least a part of the first roller in a direction parallel to the rotational axes of the first roller;
wherein a length direction of the conveyor belt is defined by the conveying direction of the conveyor belt and extends transverse to the rotational axis of the first and second roller;
wherein at least one of the first and second mounting part comprises a first tensioning system arranged for tensioning the conveyor belt in said length direction; and
wherein the first and second end of the first roller are moveable relative to each other in said length direction by the first tensioning system in response to a difference in length and/or in belt tension between the longitudinal edges of the conveyor belt; and wherein the first roller is longitudinally divided into at least two, such as three or four, longitudinal segments and said first lateral actuator is arranged to move at least one of the longitudinal segments of the first roller parallel to the rotational axis of the first roller with respect to another of said longitudinal segments of the first roller.

In a preferred embodiment, the actuator system further comprises a second lateral actuator arranged to move at least a part of the second roller in a direction parallel to the rotational axis of the second roller and the second roller is, according to a further embodiment longitudinally divided into at least two, such as three or four, longitudinal segments and said second lateral actuator is arranged to move at least one of the longitudinal segments of the second roller parallel to the rotational axis of the second roller with respect to another of said longitudinal segments of the second roller. In this embodiment, preferably also the first end and second end of the second roller are moveable relative to each other in the length direction of the conveyor as this allows lateral adjustment of the conveyor belt by laterally moving at least one of the longitudinal segments of the second roller without changing the tension in the belt. In as far as the tension in the belt would tend to being changed, this is simultaneously counteracted by—preferably automatically—adjusting, in the length direction of the conveyor, the mutual positions of the first end and second end of the second roller.

Due to fabrication imperfections as well as other causes, conveyor belts have in practice frequently a slightly 'conical configuration' in the sense that the length of the belt is along one side of the belt smaller than along the other side. The result of this conical configuration is that, when the belt is arranged around two mutually parallel rollers which are tensioned for tensioning the belt, the tension in the belt is larger at the smaller side of the belt—where the belt lies tightly around the rollers—than at the larger side of the belt—where the belt lies less tightly around the rollers—. When the conveyor belt is driven for rotation, this results in deformation of the belt—like the forming of one or more bulges—at the larger side of the belt. These deformation or bulge(s) affects the object carried on the belt. The object might be shifted and/or rotated with respected to the belt due to the deformation or bulge(s). Consequently the position of the object with respect to the belt is changed and accuracy in positioning or transferring the object is lost. As said, the 'conical configuration' might have several causes. In case of a conveyor belt made from one or more band parts, the cause might be that in the connection of two opposing edges of the band is imperfect. In case the belt is made of temperature sensitive material, like metal, such as steel, the 'conical configuration' can be caused or changed by changes in ambient temperature.

The assembly according to the invention counteracts the loss of accuracy in positioning and/or transferring by allowing the first and/or second end of the first roller to move relative to each other in the length direction of the conveyor belt. This means the first end of the first roller can move whilst the second end of the first roller does not move; or the second end of the first roller can move whilst the first end of the first roller does not move; or both the first end of the first roller and the second end of the first roller move. Preferably, said relative moveability of the first and second end of the first roller is independent from each other, i.e. movement of the first end of the first roller is independent from movement of the second end of the first roller and vice versa. By allowing this relative movement under influence of the first tensioning system, the position of the rotational axes of the first roller can adapt itself to the 'conical configuration' of the belt so that larger side of the belt engages the roller more tightly, preferably as tight as the smaller side of the belt. This adaptation to the 'conical configuration' takes place during constructing the assembly, especially when tensioning the belt. However, also during use this adaptation might take place when changes in the 'conical configuration' occur.

The conveyor belt further comprises an actuator system for moving the conveyor belt with respect to the frame. In a further embodiment, the actuator system comprises a first lateral actuator arranged to move at least a part of the first roller in direction parallel to the rotational axes of the first roller. An advantage of this arrangement is that moving at least a part of the first roller in the lateral direction will cause the object on the conveyor belt to move in the lateral direction.

Due to the rotational axis of the first and second roller not being mutually parallel—as a result of adaptation to the 'conical configuration' of the belt, the belt is susceptible to transverse shifting along the roller(s). This shifting is to be prevented. It might be prevented by arranging fixed side guides along the length of the conveyor in order to prevent transverse shift of the conveyor belt. This results however in undesired friction between the conveyor belt and side guides, resulting in loss of accuracy. This transverse shift can be elegantly corrected by dividing the first roller longitudinally into at least two, such as three or four, longitudinal segments and said first lateral actuator is arranged to move at least one of the longitudinal segments of the first roller parallel to the rotational axis of the first roller with respect to another of said longitudinal segments of the first roller. With this arrangement the lateral position of the conveyor belt may be adjusted constantly while the conveyor belt is operated. When one of the longitudinal segments is in contact with the conveyor belt it may be moved in the lateral direction. After the roller has rotated, this longitudinal segment may no longer be in contact with the conveyor belt and it may be moved back to its original position. After the roller has rotated further, the longitudinal segment is again in contact with the conveyor belt and the process starts again. Due to the first end and second end of the first roller being moveable relative to each other in the length direction of the conveyor, the lateral adjustment of the conveyor belt by laterally moving at least one of the longitudinal segments of the first roller can be performed without changing the tension in the belt. In as far as the tension in the belt would tend to being changed, this is simultaneously counteracted by—preferably automatic—adjusting, in the length direction of the conveyor, the mutual positions of the first end and second end of the first roller.

In another embodiment, the actuator system further comprises a second lateral actuator arranged to move at least a part of the second roller in a direction parallel to the rotational axis of the second roller. This enables a more accurate positioning of the conveyor belt in the lateral direction. As already explained in relation to the first roller, the second roller is, according to a further embodiment longitudinally divided into at least two, such as three or four, longitudinal segments and said second lateral actuator is arranged to move at least one of the longitudinal segments of the second roller parallel to the rotational axis of the second roller with respect to another of said longitudinal segments of the second roller. In this latter embodiment, preferably also the first end and second end of the second roller are moveable relative to each other in the length direction of the conveyor as this allows lateral adjustment of the conveyor belt by laterally moving at least one of the longitudinal segments of the second roller without changing the tension in the belt. In as far as the tension in the belt would tend to being changed, this is simultaneously counteracted by—preferably automatically—adjusting, in the length direction of the conveyor, the mutual positions of the first end and second end of the second roller.

According to again a further embodiment, at least one of the third and fourth mounting part comprises a second tensioning system arranged for tensioning the conveyor belt in said length direction; wherein the third and fourth end of the second roller are moveable relative to each other in said length direction by the second tensioning system in response to a difference in length and/or in belt tension between the longitudinal edges of the conveyor belt. By allowing also the first and second end of the second roller to move relative to each other in a manner similar to the first and second end of the first roller, a more flexible mounting of the conveyor belt to the frame is obtained and the accuracy in transfer and positioning is further increased, especially in case of longer conveyor belts.

According to a further embodiment of the invention, the first end of the second roller is, viewed in said length direction, moveable with respect to the frame, and wherein the second end of the first roller is, viewed in said length direction, moveable with respect to the frame. By having both ends of the second roller moveable with respect to the frame in said length direction, maximum improvement of accuracy becomes possible. Note, that as discussed in relation to the first roller, said relative moveability of the first and second end of the second roller is preferably independent from each other, i.e. movement of the first end of the second roller is independent from movement of the second end of the second roller and vice versa.

According to an embodiment of the invention, the first end of the first roller is, viewed in said length direction, fixed relative to the frame, and the second end of the first roller is, viewed in said length direction, moveable with respect to the frame. By having one end of the first roller fixed relative to the frame, uncontrolled drifting—and consequently loss of accuracy—of the first roller and consequently of the conveyor belt with respect to the frame is prevented.

According to a further embodiment of the invention, the first tensioning system is arranged to exert a tension to the conveyor belt which is uniform along the length of the first roller. This means that the tightness of engagement of the belt with the first roller—in other words the pressure between belt and first roller—is essentially constant all over the length of the first roller. This minimizes, if not completely removes, positional inaccuracy due to the 'conical configuration' of the belt.

According to a further embodiment of the invention, the second tensioning system is arranged to exert a tension to the conveyor belt which is uniform along the length of the second roller. As already explained in relation to the first roller, this means that the tightness of engagement of the belt with the second roller is essentially constant all over the length of the second roller, minimizing, if not completely removing, positional inaccuracy due to the 'conical configuration' of the belt.

In an embodiment of the invention, the first roller is an end roller—also called return roller—and the second roller is also an end roller—also called return roller—.

In another embodiment, the actuator system comprises a motor arranged to drive the conveyor belt. This enables positioning of the conveyor belt and thus the object in the transport direction.

In another embodiment, the actuator system comprises a vertical actuator to move at least a part of the conveyor belt in a direction transverse to said longitudinal direction and said rotational axis of the rollers, which direction will in general be the vertical direction. This enables positioning of the conveyor belt in the vertical direction.

In another embodiment, the positioning system further comprises a sensor for determining a position of the conveyor belt and for sending a position signal in accordance with a position determined, wherein the actuator system is arranged for receiving the position signal and for moving the conveyor belt based on the position signal.

An advantage of these arrangements is that the position of the object or the conveyor belt may be monitored by the sensor and the position of the conveyor belt may be adjusted when needed. The adjustment may take place in three dimensions, i.e. in a transport direction, in a lateral direction and/or a vertical direction.

In another embodiment, at least one of the mounting parts comprises one of the following for providing the tension in the conveyor belt: a resilient material; a pneumatic cylinder; a counterweight; pneumatic bellows; a spring. An advantage of a resilient material, a spring and a pneumatic cylinder is that they can provide a constant force on an end of a roller, as is explained below. In another embodiment, at least one of the mounting parts comprises a counterweight or pneumatic bellows for providing the tension in the conveyor belt. An advantage of the counterweight and the pneumatic bellows is that it provides a constant force on an end of a roller, wherein the strength of the force is independent from the position of the end of the roller, as is explained below. An advantage of pneumatic bellows is that they may provide a constant force without friction. The same can be achieved by using a long spring which is pre-tensioned by compressing it over a large distance.

In an embodiment, an assembly according to the invention can be used for positioning a substrate in a printer.

In an embodiment of the assembly, the conveyor belt is made from a band having opposed ends connected to each other to form said endless conveyor belt.

In an embodiment of the assembly, an actuator system comprises a motor arranged to drive the conveyor belt.

In an embodiment of the assembly, the assembly is a positioning assembly for positioning an object with an accuracy of about 10 μm or with a positioning error of less than 10 μm.

In an embodiment of the assembly, the assembly is a conveyor system for conveying an object.

BRIEF DESCRIPTION OF THE FIGURES

Embodiments of the invention will be described, by way of example only, with reference to the accompanying schematic drawings in which corresponding reference symbols indicate corresponding parts, and in which.

DETAILED DESCRIPTION OF THE INVENTION

Figure 1:
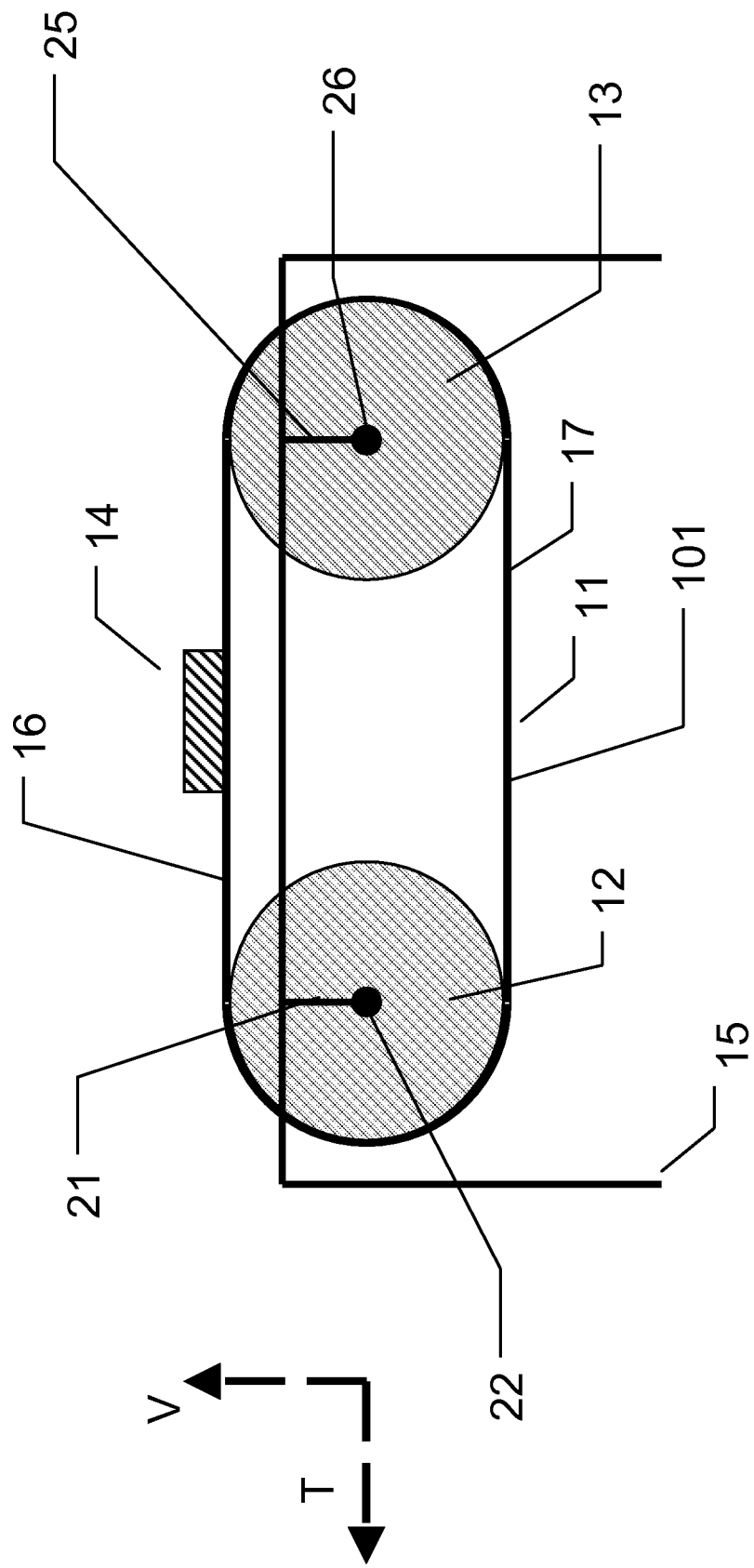
FIG. 1 shows a schematic representation of a side view of an embodiment of an assembly according to the invention.
Figure 2:
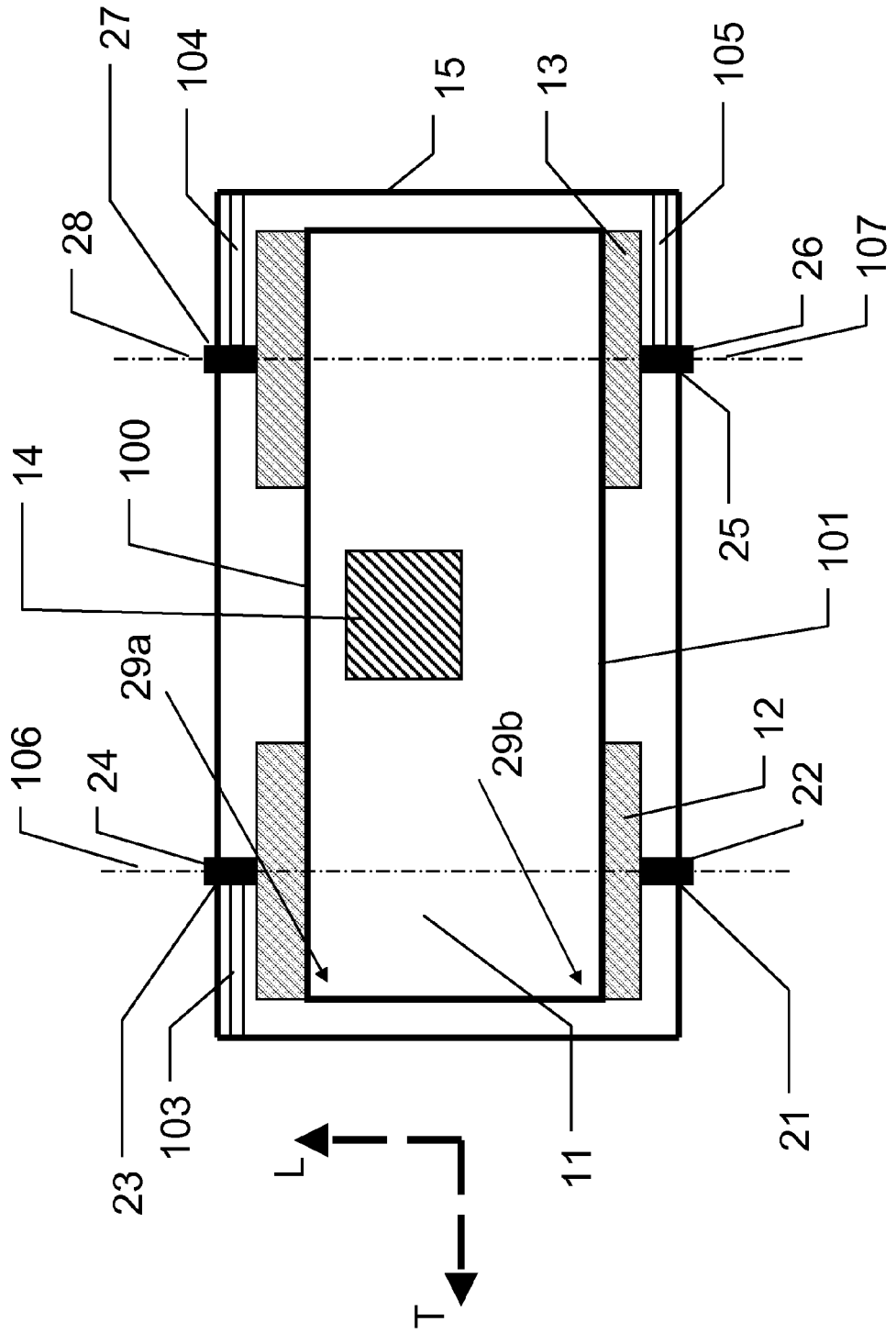
FIG. 2 shows a schematic representation of a top view of an embodiment of an assembly according to the invention.

FIGS. 1 and 2 show a schematic representation of a side view (FIG. 1) and a top view (FIG. 2) of an embodiment of the assembly according to the invention. According to the invention, a conveyor belt 11 is arranged around two conveyor belt rollers, a first roller 12 and a second roller 13. The assembly according to the invention may comprise more than two rollers. The two rollers 12, 13 may be the end rollers—or return rollers—of the conveyor. On the upper part of the conveyor belt an object 14 is placed, as an example.

The part of the conveyor belt 11 on which the object 14 is placed between the two rollers 12, 13 may be referred to as the conveying part 16 of the conveyor belt. The part of the conveyor belt opposite to the conveying part 16 may be referred to as the return part 17 of the conveyor belt.

When the length of the first longitudinal edge 100 differs from the length of the second longitudinal edge 101, the belt will, viewed in a direction parallel to the rotational axis 106, 107 of the rollers, have a (slightly) conical shape, called here 'conical configuration'. When such a belt with 'conical configuration' is tensioned between two rollers having mutually parallel rotational axis, the belt tension at the smaller side—see 29a in FIG. 2 or 100 in FIG. 8—will be larger than at the larger side—see 29b in FIG. 2 or 101 in FIG. 8—. This results in deformation or bulging of the belt when the belt is driven. This deformation or bulging affects the position of the object 14 on the belt in the sense that the object might shift and/or rotate with respect to the surface of the belt. Consequently the accuracy of the belt in transferring and or positioning the object decreases. These problems are according to the invention overcome by allowing at least one of the first end or the second end of the first roller, and preferably also at least one of the first end or the second end of the second roller, to move relative to each other in response to a difference in length and/or in belt tension between the longitudinal edges of the conveyor belt.

Further, variations in belt tension between locations 29a and 29b in FIG. 2 might during use occur due to for example changes in ambient temperature, wear or other causes. By allowing at least one of the first end or the second end of the first roller, and preferably also at least one of the first end or the second end of the second roller, to move relative to each other also these variations can be compensated according to the invention. Maintaining a constant tension over the width of the conveyor belt contributes to an accurate positioning of the object on a conveyor belt.

Preferably, the conveyor belt 11 comprises a metal, since a metal conveyor belt may deform less than other types of belts, for example rubber belts. Preferably, the conveyor belt 11 is a steel conveyor belt.

In FIGS. 1 and 2 three directions are defined. A transport direction T—in this application also called the length direction of the conveyor belt—is defined as a direction parallel to the longitudinal axis of the endless conveyor belt. The transport direction T is indicated by in FIGS. 1 and 2. A lateral direction L is defined as a direction perpendicular to the transport direction and substantially parallel to at least one of the axes 106, 107 of the rollers. The lateral direction is indicated by arrow L in FIG. 2. Perpendicular to both the transport direction and the lateral direction, a vertical direction is defined. The vertical direction is indicated by arrow V in FIG. 1. The term translation direction as is used in this document refers to a direction parallel to a transport direction.

The two rollers 12, 13 are mounted in a frame. FIGS. 1 and 2 show an example of a frame 15. According to the invention a mounting is provided, comprising a first mounting part 21 connected to a first end 22 of the first roller 12 and a second mounting part 23 connected to a second end 24 of the first roller 12. The first end 22 of the first roller 12 and the second end 24 of the first roller 12 are, independently from each other, movable with respect to the frame 15 in the length direction T of the conveyor belt. Preferably, the first end 22 is, viewed in the length direction T, fixed relative to the frame and the second end 24 of the first roller is, viewed in the length direction T, moveable with respect to the frame. Both the first mounting part 21 and the second mounting part 23 allow rotation of the first roller 12 around its rotational axis 106, which extends through the opposing ends 22 and 24 of the first roller.

The mounting is arranged to move, by means of the tensioning system 103, the first mounting part and the second mounting part independently from each other in a said length direction T with respect to the frame 15, in reaction to a difference (or change) of the tension between the longitudinal edges 100 and 101 and/or in reaction to a difference (or change) in length between the longitudinal edges 100 and 101, for adjusting the tension.

It is advantageous that the first mounting part 21 and the second mounting part 23 allow mutually independent movement of the first and second end of the first roller 12. For example, if the tension at the location indicated by arrow 29a is increasing with a percentage X and the tension at the location indicated by arrow 29b is increasing with a percentage Y, the first end 22 of the first roller may be moved to counteract a tension increase of X percent, while second end 24 of first roller 12 may be moved to counteract a tension increase of Y percent. In case the first end 22 is fixed relative to the frame 15, compensation for the tension increases is still possible in case the first and second end of the second roller are moveable relative to each other in the length direction T of the conveyor. In this latter situation, preferably both the first and the second end of the second roller are moveable, in the length direction of the conveyor, with respect to the frame.

The tension in the conveyor belt will cause the conveyor belt to exert a force on the two rollers and thereby on the ends of each roller. A local variation of the tension may therefore cause a variation of the force that is exerted on an end of one of the rollers. In this way, an end of a roller is effected by a local variation of the tension. The movement of a roller end may counteract this force variation.

The first and second mounting parts 21, 23 (and thus the two ends 22, 24 of the first roller) may be moved to cancel or compensate for variations of the tension in the conveyor belt 11 as much as possible, in other words, to maintain a constant tension in the conveyor belt 11 as much as possible.

The mounting may be arranged to move the roller ends associated to its mounting parts independently from each other in a the length direction with respect to the frame in reaction to a local change of the tension to maintain a pre-defined tension.

The value of this pre-defined tension may be determined before use. The pre-defined value of the constant tension may be an optimized value for the conveyor belt 11 that is used in the assembly or may just be any value representing a tension that is to be maintained during operation of the assembly.

The movement of the first 22 and/or second 24 end of the first roller may be in a single plane of movement, for example a plane parallel to a transport direction T and lateral direction L. The suspension may be arranged to move the two ends of the first roller in said single plane. Movement in this plane may be advantageous when the first roller 12 is placed in a reversing end of the conveyor belt 11.

According to an embodiment of the invention, the mounting further comprises a third mounting part 25 connected to the first end 26 of the second roller 13 and a fourth mounting part 27 connected to the second end 28 of the second roller 13. The mounting, especially the third and fourth mounting part comprising the second tension means, is arranged to move the first end 26 of the second roller and second end 28 of the second roller independently from each other in a the length direction of the belt with respect to the frame in reaction to a difference (or change) in length between the longitudinal edges 100, 101 of the conveyor belt and/or in reaction to a difference (or change) in belt tension between the longitudinal edges 100, 101 of the conveyor belt. An advantage of this configuration is that it enhances the ability of the assembly according to the invention to maintain a constant tension in the conveyor belt.

It may also be advantageous that the mounting may be arranged to move the first roller 12 independently from the second roller 13. Furthermore, it may be advantageous that the mounting is arranged to move the four ends 22, 24, 26, 28 of the two rollers 12, 13 independently form each other in reaction to a change in the tension of the belt This may be such that an inaccuracy of the position of said object carried by the conveyor belt, due to said local change of the tension is counteracted. At least one, such as two or three, of the four ends 22, 24, 26, 28 of the two rollers 12,13 may be suspended freely from the frame 15.

With respect to the effects of the third and fourth mounting parts (and thus the effect of the movement of the first and second end of the second roller) the same applies as what has been described above with respect to the effects of the first and second mounting part (respectively the effect of the movement of the first and second end of the first roller).

The movement of the first 26 and second 27 end of the second roller 13 may be in a single plane of movement, for example a plane parallel to a transport direction T and a lateral direction L. The mounting may be arranged to move the two ends of the second first roller in one plane. It may be the same plane of movement as the above mentioned plane of movement of the first and second mounting parts 21, 23. Movement in this plane may be advantageous when the first and second roller are placed in a reversing end of the conveyor belt 11.

In an embodiment, the assembly according to the invention comprises two rollers 12, 13 placed in the reversing ends of the conveyor belt 11, as is indicated in FIGS. 1 and 2. The assembly may comprise more rollers or supporting devices to support the conveyor belt 11, but since contact of the conveyor belt with these rollers and supporting devices may cause variations in the tension of the conveyor belt, it is advantageously to provide a positioning assembly with only the two rollers 12, 13.

With the two rollers 12, 13 placed in the reversing ends of the conveyor belt 11, movement of the four ends 22, 24, 26, 28 of the two rollers 12, 13 may take place in one single plane to adjust the tension of the conveyor belt 11, the plane being defined by the two lateral axes of the two rollers 12, 13.

FIGS. 3a-3d illustrate four examples of a mounting part 23. One or more of the other mounting parts 21, 25, 27 may have the same features and may be provided accordingly, mutatis mutandis. However, as earlier addressed, it is noted that the first mounting part is preferably arranged so that the first end 22 of the first roller 12 is, viewed in the length direction of the conveyor belt, fixed relative to the frame.

Figure 3B:
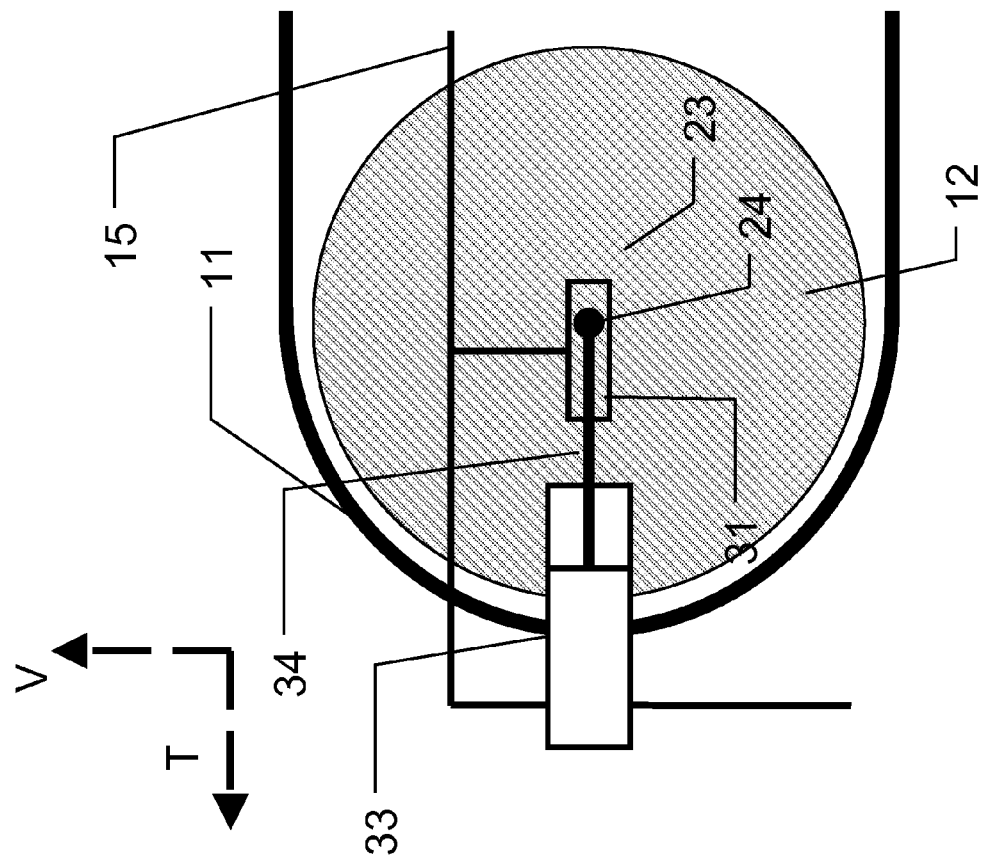
FIGS. 3a-3d show a schematic representation of four examples of a mounting part according to the invention.
Figure 3A:
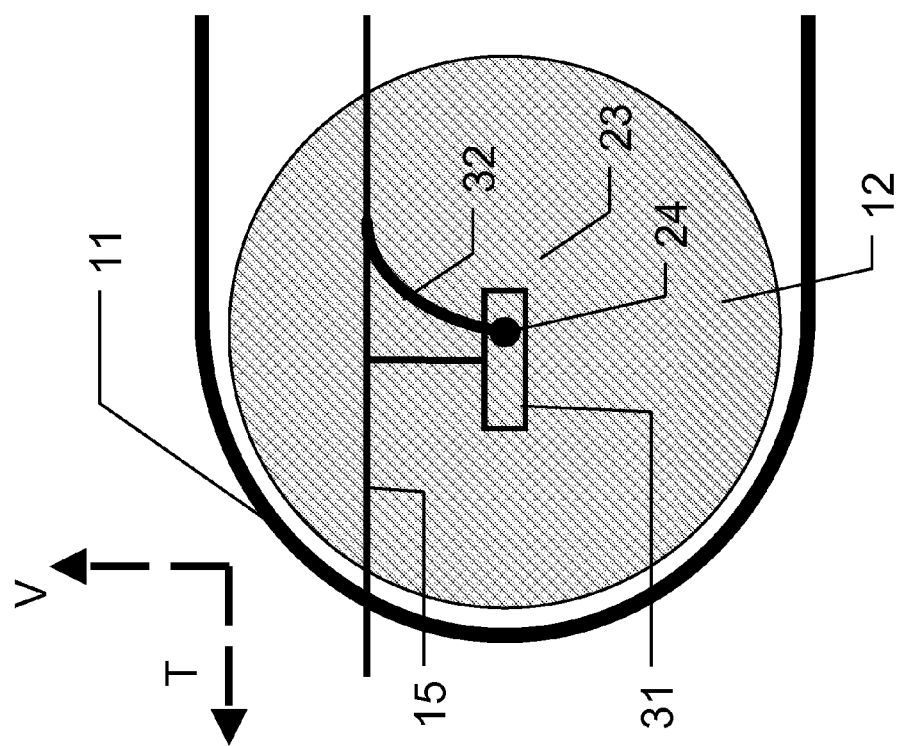

FIG. 3a depicts a mounting part 23 comprising a guide 31 for guiding the second end 24 of the first roller 12. The guide 31 allows the second end 24 to move in a transport direction T and back and may prevent the second end 24 to move in a vertical direction V and may prevent the second end 24 to move in a lateral direction L. The guide 31 is fixed to the frame 15. The mounting part 23 further comprises a bar 32 connected to the second end 24 and, directly or indirectly, to the frame 15.

The bar 32 may comprise a resilient material, such that the bar 32 may be bend by the second end 24 when the conveyor belt 11 is placed around the first roller 12. While bending back, the bar 32 will provide a tension in the conveyor belt 11. This will result in an equilibrium: the force exerted on the second end 24 by the bar 32 will be equal to the force exerted on the second end 24 by conveyor belt 11 having a certain tension.

When the tension in the conveyor belt 11 varies, the equilibrium is interrupted. In case the tension in the conveyor belt 11 decreases, the force exerted on the second end 24 by the bar 32 will be greater than the force exerted on the second end 24 by the conveyor belt 11. It will cause the second end 24 to move in a transport direction T, causing the tension in the conveyor belt 11 to increase. In this way, the equilibrium is restored and the tension in the conveyor belt 11 is the same as before.

In case the tension in the conveyor belt increases, the force exerted on the second end 24 by the bar 32 will be smaller than the force exerted on the second end 24 by the conveyor belt 11. This will cause the second end 24 to move in a direction opposite to arrow T, resulting in decrease of the tension in the conveyor belt 11. In this way, the equilibrium is restored and the tension in the conveyor belt 11 is the same as before.

Figure 3C:
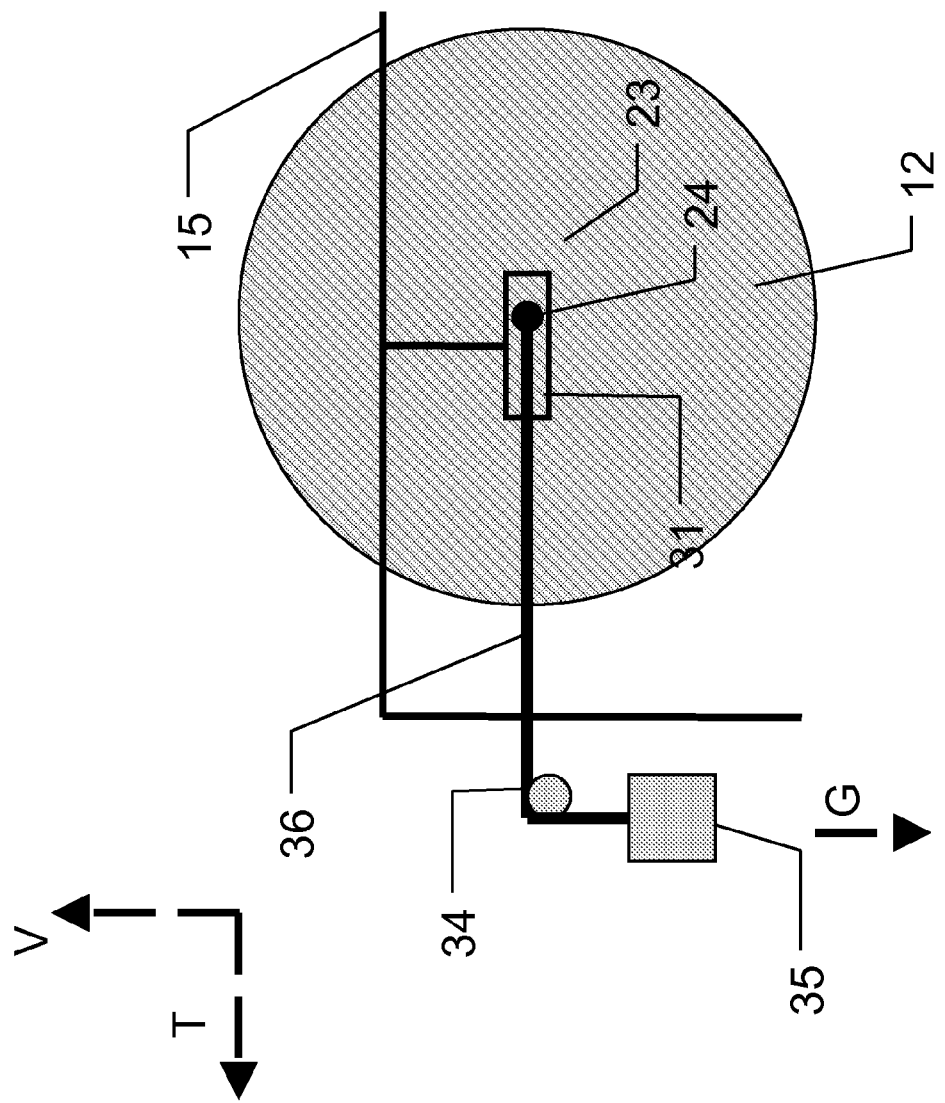
Figure 3D:
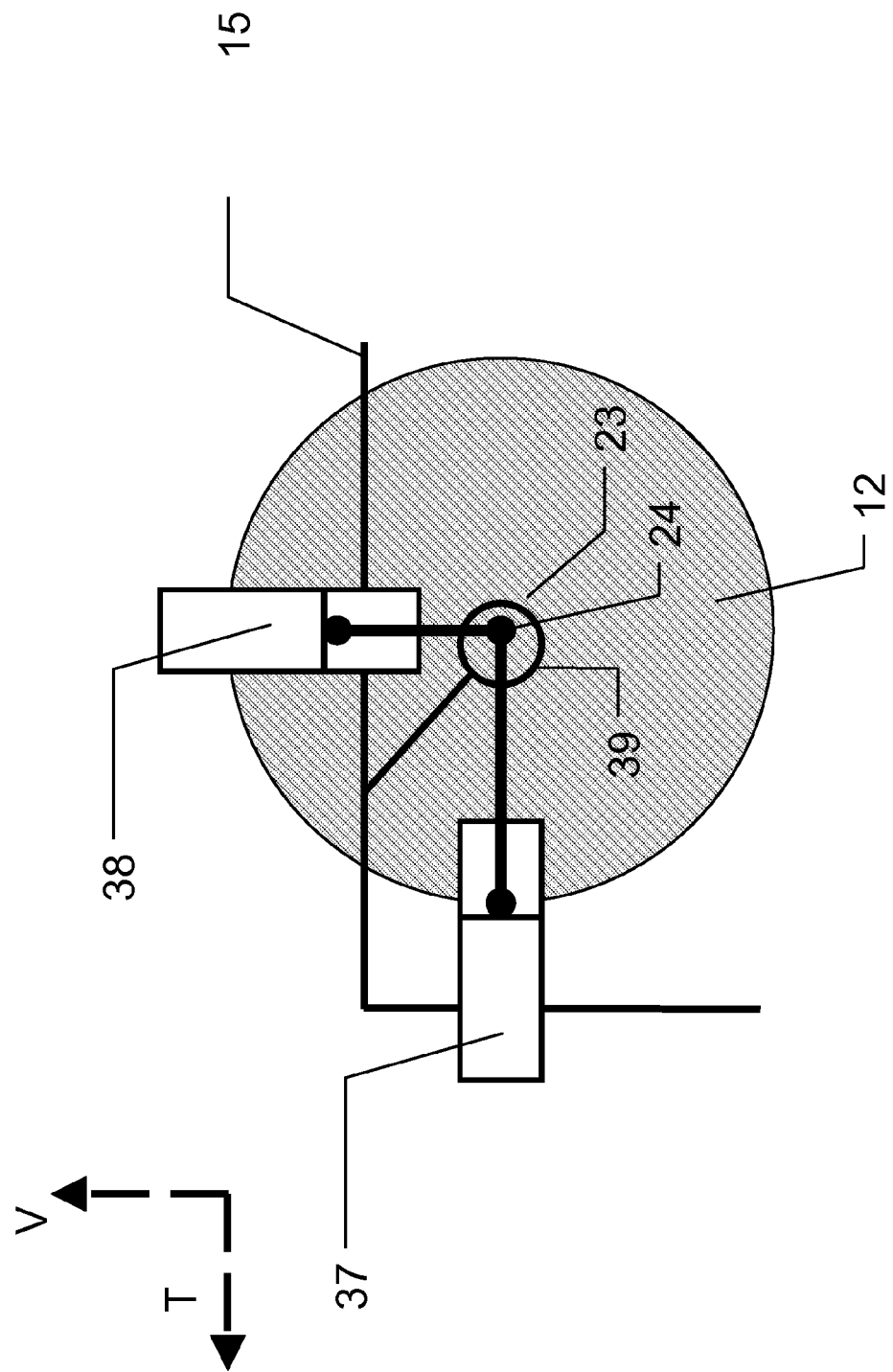

The force provided on the second end 24 may be provided in different manners and FIGS. 3b-3d provide several other examples. The force may cancel the variations in the tension in the conveyor belt by moving the second end 24. To obtain a constant tension in the conveyor belt, a force is to be provided that is constant. This force may be provided using a resilient material, such as a spring. A relatively long spiral spring might be used. Compressing such a spring over a large distance results in a pre-tension force of the spring which is approximately constant in case of (little) changes in length of the spring. As will be clear the direction in which the pre-tension force is active is parallel to the length direction T of the conveyor.

FIG. 3b provides another example of a mounting part 23. Mounting part 23 comprises a guide 31 and a pneumatic cylinder 33 connected to the second end 24 by a connecting bar 34. The pneumatic cylinder is directly or indirectly connected to the frame 15. The pneumatic cylinder may be an air cylinder. In that case compressed air in the air cylinder may provide the required force on the second end 24 via connecting bar 34. In the same way as described with respect to FIG. 3a, an equilibrium is maintained between the force exerted by the compressed air on the second end 24 and the force exerted on the second end 24 by conveyor belt 11. Instead of using air as a medium that may be compressed, also other compressible materials may be used.

The pneumatic cylinder 33 may also be an active component. In that case the force provided by the pneumatic cylinder 33 may be controlled by a controlling unit. The controller unit may receive an input signal indicating a variation of the tension in the conveyor belt and may cause the pneumatic cylinder 33 to adjust its force to cancel the variation or to adjust the position of the second end 24 to cancel the variation.

The force provided by the mounting part 24 on second end 24 needs to be constant, or as constant as possible, to obtain a constant tension in the conveyor belt. In an embodiment of the assembly a mounting part comprises a counterweight or a mass. A counterweight may provide a constant force when gravity is acting upon it. The strength of the force may be independent of the position of the second end 24.

FIG. 3c illustrates a basic example of how to use a counterweight or a mass to provide a constant force in an assembly according to an embodiment of the invention. It is to be understood that more complex constructions using for example one of more levers may also be applied in order to use the gravitational force on a mass to provide a constant force. Mounting part 23 comprises a guide 31 and a counterweight or a mass 35 which is connected to the second end 24 via, for example, a string 36 and a roller 35. The gravity working in a direction indicated by arrow G on the mass 35 will cause a constant force being exerted on the second end 24. The working of the mounting part 23 in FIG. 3c is as described above with reference to FIGS. 3a and 3b, with the counterweight or mass providing the force exerted on the second end 24.

In another embodiment, pneumatic bellows are used to provide the constant force on the second end 24. A container or ribs on the pneumatic bellows may be used to allow the pneumatic bellows to expand in only direction. An advantage of pneumatic bellows is that they may expand without friction. With friction, the force exerted on the second end 24 by the conveyor belt has to overcome a friction force before the second mounting part 23 may be moved. Without a friction force, the mounting may react better, more accurate or faster to changes in the tension in the conveyor belt.

According to an embodiment of the invention, one or more of the mounting parts 21, 23, 25, 27 may be movable in two dimension, i.e. in a length direction T of the conveyor and a direction perpendicular to said length direction. In FIG. 3d an example of such mounting part (23) is depicted. The example of FIG. 3d uses two pneumatic cylinders 37, 38 to provide a constant force in the two directions. Other constructions are also possible, for example a counterweight construction according to FIG. 3c, a construction with a resilient material (according to FIG. 3a) or a spring. Combinations of different constructions for different directions are also possible. The guide 39 is arranged to allow movement of the second end 24 in the two directions.

Movement in the two directions provides a more flexible mounting that improves the ability of the positioning assembly to maintain the tension in the conveyor belt constant. Especially, when a force in the vertical direction is exerted on the conveyor belt 11, for example by the gravitational force on the object or a vertical actuator (see below), it may be advantageously to adjust the vertical position of one or more ends of the two rollers.

According to an embodiment, the assembly according to the invention may comprise an actuator system for moving and/or driving the conveyor belt 11. The actuator system may comprise a motor for driving the conveyor belt 11 in a transport direction T by driving one or more rollers, for example the first roller 12 and/or the second roller 13. As an example, it can be seen in FIG. 4 that a motor 41 is connected to the second roller 13. When the motor 41 is operated, the second roller 13 will rotate about its rotational axis 107 and conveyor belt 11 will move in a transport direction. This will cause the object 14 to move accordingly.

Figure 4:
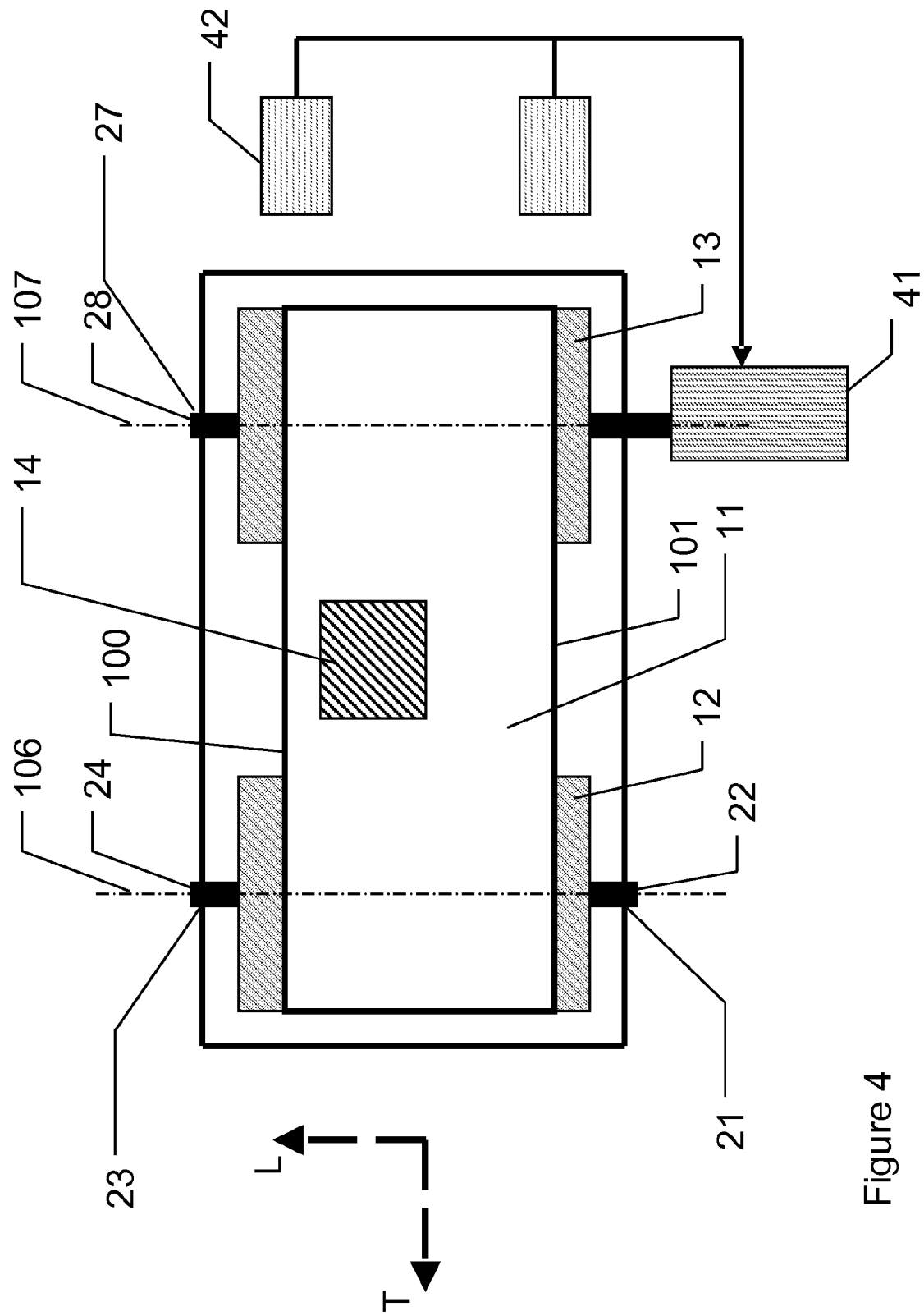
FIG. 4 shows a schematic representation of a top view of another embodiment of an assembly according to the invention.

In an embodiment, the assembly according to the invention may further comprise a sensor for determining a position of the conveyor belt. In FIG. 4, two sensor devices 42 are provided as an example of such a sensor. Each sensor device may monitor an edge of the conveyor belt. In this way, movement of the conveyor belt in the lateral direction may be monitored. The sensor may be a sensor that monitors markings on the conveyor belt, on one of the rollers or on the object.

The sensor may send a positioning signal to the actuator system with information about the position of the conveyor belt 11, one of the rollers or the object 14. The actuator system may be arranged to use the positioning signal to drive the motor 41.

The sensor and the actuator system may form a positioning controller to control the position of the conveyor belt 11 and thus the position of the object 14, for example with a positioning error of less than 10 µm.

The actuator system may also comprise one or two lateral actuators for moving the conveyor belt 11 in a lateral direction L. Moving the conveyor belt 11 in a lateral direction L may be required to move the object 14 in a lateral direction. It may also be required to reduce or correct an undesired conveyor belt drift. A conveyor belt drift is a lateral movement or shift of the conveyor belt with respect to the rollers that occurs when the conveyor belt is operated, caused for example by a conic shape of the conveyor belt or a misalignment of the rollers.

A lateral movement of the conveyor belt 11 may be achieved by moving a roller, for example the first roller 12, completely in a lateral direction. It may also be achieved by using a roller with a crowned or convex shape. It may also be achieved by moving a part of a roller in lateral direction. If (a part of) both the first and the second roller is moved in a lateral direction, the conveyor belt 11 may be translated in the lateral direction without the object rotating about one of its axes. In this way the conveyor belt and, if present, an object on the belt may be moved or translated in the lateral direction without movement of the conveyor belt 11 in a transport direction T or without using motor 41.

In the assembly as described above, the position of the conveyor belt and/or object may be controlled in two dimensions in freedom (i.e. in transport direction and a lateral direction). Furthermore, movement of the conveyor belt in the lateral dimension may take place independently from movement in the transport direction and vice versa.

Figure 5:
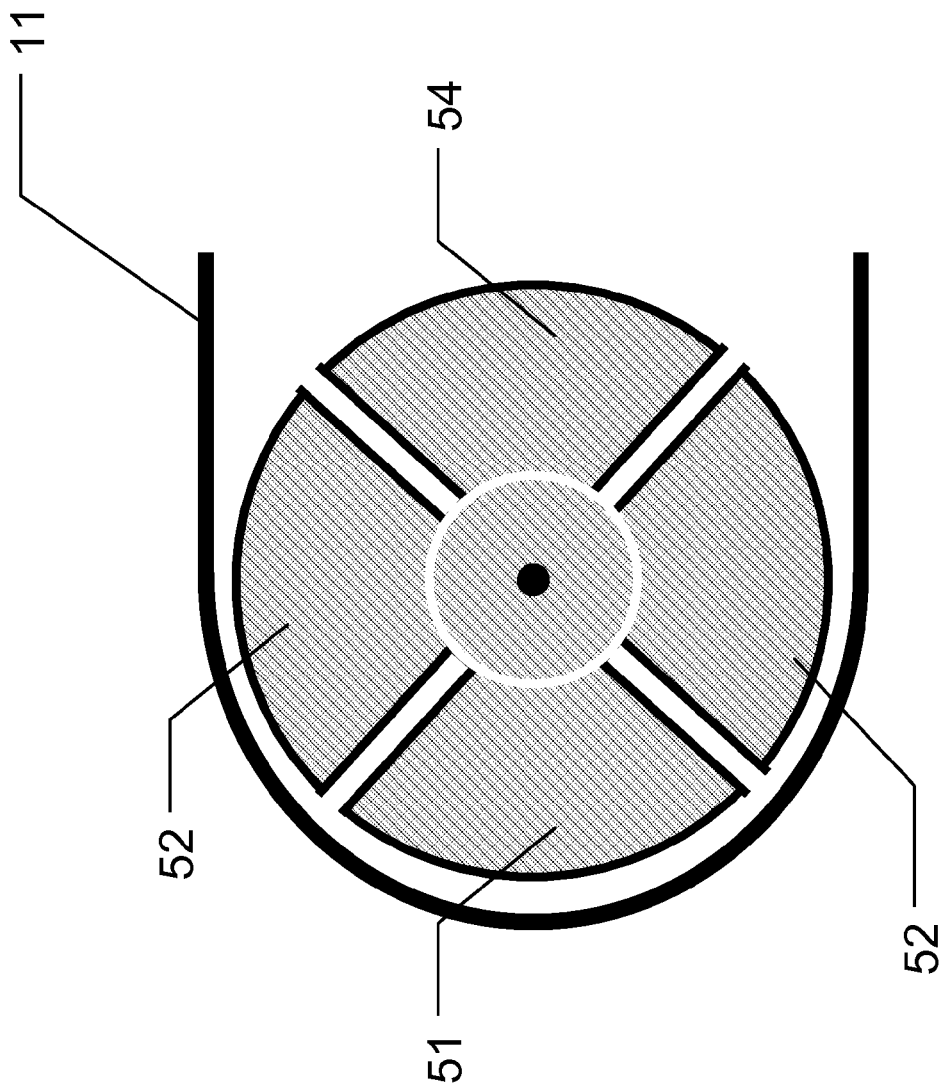
FIG. 5 shows a schematic representation of a roller according to the invention.

In an embodiment of the invention a roller is in its longitudinal direction divided to comprise at least two longitudinal segments, preferably three or four segments. FIG. 5 depicts an example of a roller with four segments 51, 52, 53, 54, wherein each segment has the same dimensions—and has the same length in its longitudinal direction (L)—and may be moved in a lateral direction and back. Preferably, each segment extends—in direction L—over the entire length of the roller. One of the segments that is in contact with the conveyor belt (for example section 52, 51 or 53) may be moved in a lateral direction L, thereby moving the conveyor belt 11 in a lateral direction. One of the segments that is not in contact with the conveyor belt (for example segment 54) may be moved back to its original position or kept in its original position. This has the advantage that the conveyor belt 11 may be continuously moved in a lateral direction while the conveyor belt 11 is transported around the rollers. This may be used to reduce the conveyor belt drift.

Figure 6B:
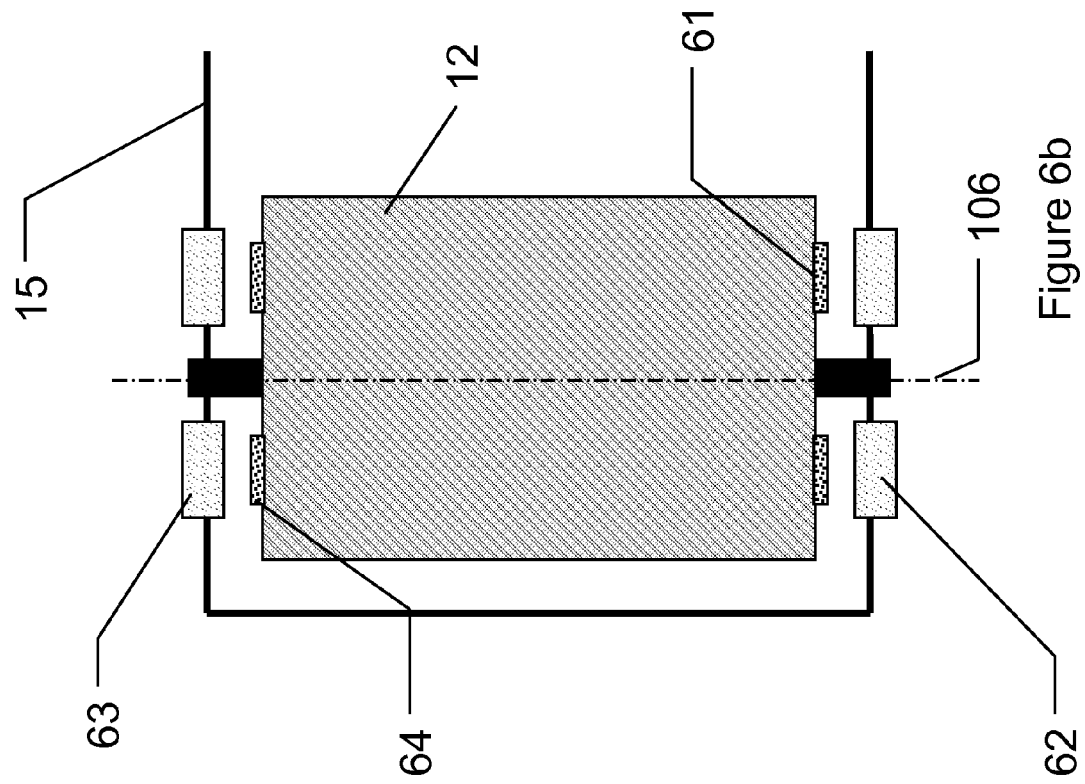
FIGS. 6a and 6b shows a schematic representation of a roller and a lateral actuator according to the invention.
Figure 6A:
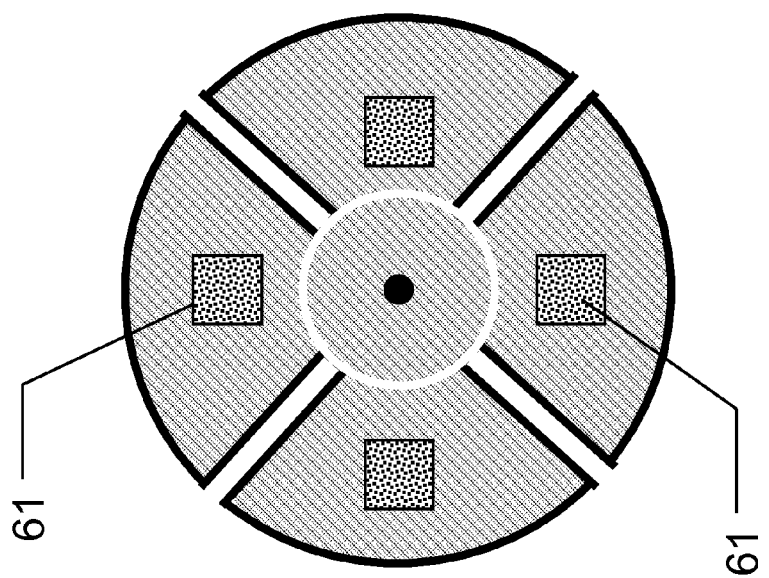

FIGS. 6a and 6b illustrate how an example of a lateral actuator may work. According to an embodiment of the invention, at least one of the longitudinal segments of the first and the second roller is provided with a metal plate 61 at one lateral side of the longitudinal segment and with another metal plate 64 at the other lateral side of the longitudinal segment. FIG. 6a shows an example of four longitudinal segments, each provided with a metal plate 61 at one lateral side. The metal plates at the other lateral side of the four longitudinal segments are not depicted in FIG. 6a.

The metal plate 61 may have any shape, like the square shape shown, or may be a part of a metal ring, wherein the combination of the metal parts on the longitudinal segments may form together a segmented metal ring. When the roller is rotating around its lateral axis, each metal plate follows a trajectory about the lateral axis of the roller.

The lateral actuator may comprise at least two controllable magnets 62, 63, each positioned at one lateral side of the longitudinal segments, as can be seen in FIG. 6b. The controllable magnets are positioned in front of at least a part of the trajectory of the metal plates 61, 65. The strength of the magnetic force of the magnets 62, 63 on the metal plates on both lateral sides may be controlled in such way that a longitudinal segment may be moved by the magnets in the lateral direction and back.

An actuator configuration like shown in FIGS. 6a and 6b allows lateral movement of the conveyor belt during stand still of the belt (i.e. the belt is not rotated to move in the transportation direction) or during operation of conveyor belt.

Figure 7:
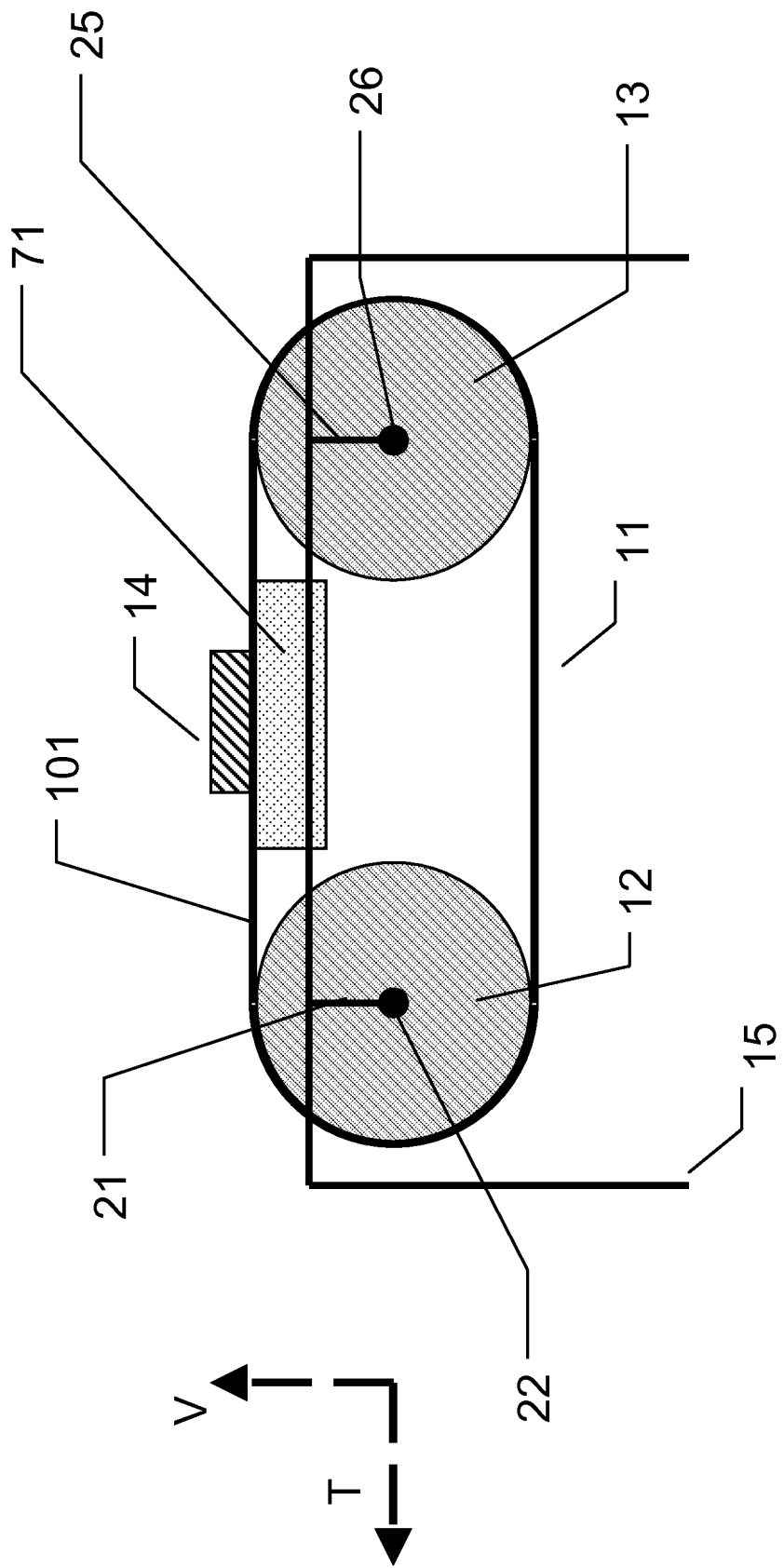
FIG. 7 shows a schematic representation of a side view of another embodiment of an assembly according to the invention.

In an embodiment of the invention, the actuator system may comprise a vertical actuator 71. The vertical actuator may be arranged to move at least a part of the conveyor belt in a vertical direction, as is illustrated in FIG. 7. Or the vertical actuator may provide support to the conveyor belt. In this way the vertical position of the conveyor belt may be controlled.

The vertical actuator 71 may comprise a bed or a cushion located between the roller 12, 13. To minimize wear and disturbances due to contact, a contactless or pre-loaded air-bearing support may provided as a vertical actuator 71. The vertical actuator 71 may use an air flow or an magnetic force to act on the conveyor belt. The pre-loaded bearing may improve the vertical stiffness of the conveyor belt. This is relevant when the positioning of the object is to be accurate in the vertical direction, for example with a positioning error of less than 10 µm.

The actuator system may comprise one or more lateral actuators according to the example described above for moving at least one of the segments of the rollers in a lateral direction and back. The actuator system may comprise a motor for moving the conveyor belt in a transport direction and/or a vertical actuator for moving the conveyor belt in a vertical direction. The actuator system may do so on the basis of the positioning signal or information about the (desired) position of the conveyor belt 11, one of the rollers or the object 14. The positioning signal, provided by the sensor to the actuator system may comprise such information.

However, the movement of a segment that is in contact with the conveyor belt 11 may also introduce a variation of the tension of the conveyor belt 11. According to an embodiment of the invention, this variation is canceled, compensated or minimized by the mounting, as is described above, for example with reference to FIGS. 3a-3d.

A positioning assembly according to one of the embodiments described in this document may be a positioning assembly for positioning an object with an accuracy of about 10 μm or with a positioning error of less than 10 μm.

A positioning assembly according to one of the embodiments described above may be used in applications in which an object (or substrate) is to be positioned with an accuracy of less than ten micrometers. An example is a printer where a substrate is to be positioned with an accuracy of less than ten micrometers. Another example is an imaging or deposition device in which material is to be placed on a substrate with a high accuracy. Also scanning with a line camera requires the positioning and the movement of an object with high accuracy. A positioning assembly according to one of the embodiments described above may therefore be advantageously used in such a scanning device.

Figure 8:
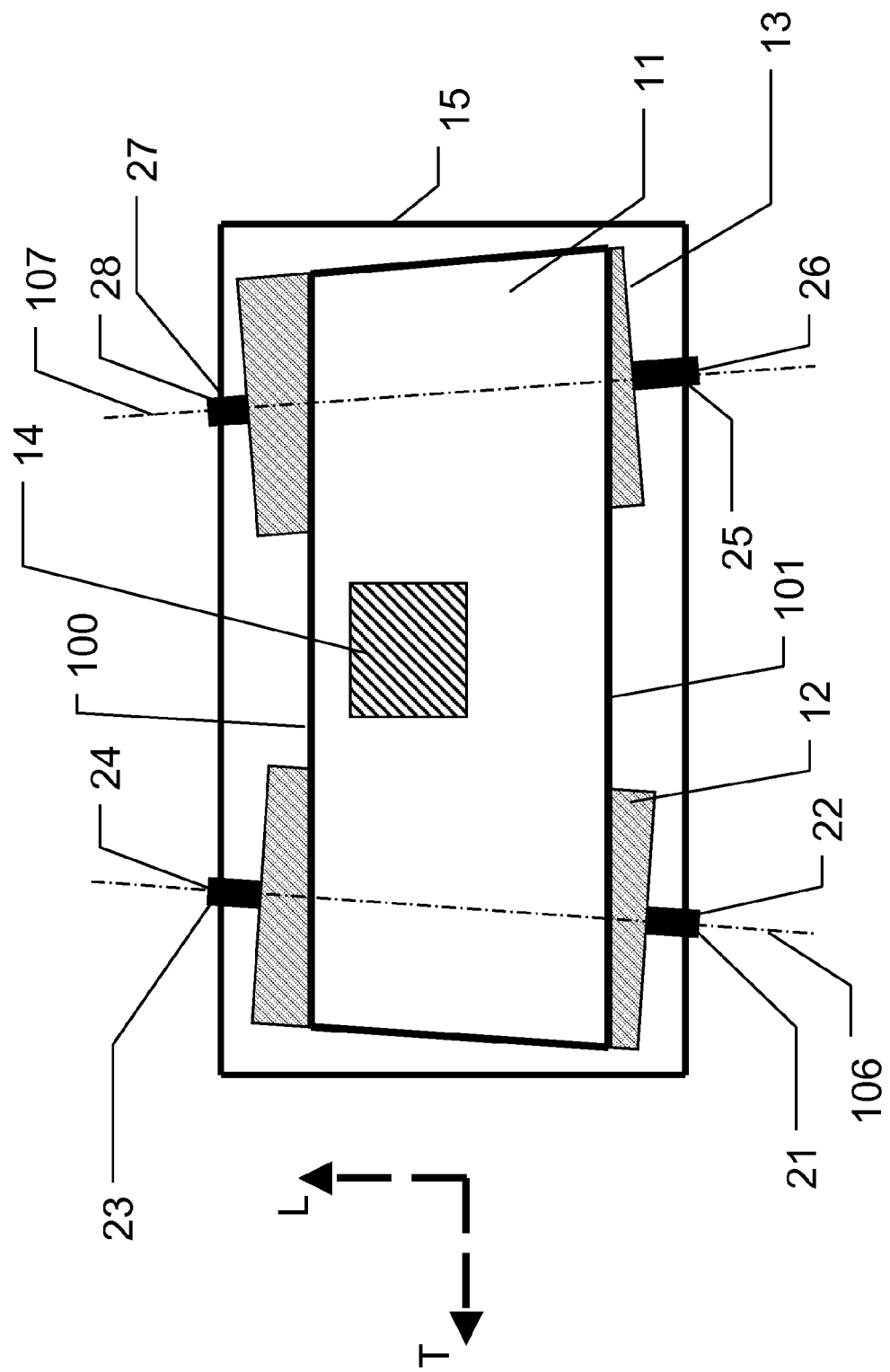
FIG. 8 shows a schematic representation of a top view of yet another embodiment of an assembly according to the invention.

FIG. 8 illustrates an embodiment of the invention. The positioning assembly comprises a conveyor belt 11 and only two rollers 12, 13, both placed in respective reversing ends of the conveyor belt 11. Conveyor belt 11 may have a conic shape, as is shown, in exaggerated manner, in FIG. 8. Each roller comprises at least two longitudinal segments and preferably four longitudinal segments with equal dimensions. The positioning assembly comprises an actuator system for moving the conveyor belt 11 in the lateral direction and in the transport direction. The actuator system comprises a motor 41 to drive one of the rollers, thereby moving the conveyor belt in the transport direction and two lateral actuators. The first lateral actuator is arranged to move at least one segment of the first roller in the lateral direction and back. The second lateral actuator is arranged to move at least one segment of the second roller in the lateral direction and back.

The actuator system enables the positioning of an object placed on the conveyor belt in two dimension, i.e. in the transport direction and in the lateral direction. Movement of the conveyor belt in the lateral position is possible without movement of the conveyor belt in the transport direction and vice versa. In this way, the position of the object placed on the conveyor belt 11 may be controlled in two degrees of freedom of the object, i.e. in a transport direction and a lateral direction.

However, these movements may cause variations of the tension in the conveyor belt 11. Variations of the tension may cause the conveyor belt to deform, which may cause the object to move as well. A displacement of the substrate caused by tension variations may in the range of micrometers.

Therefore, a mounting which suspends the two roller 12, 13 from the frame 15, is provided for maintaining a constant tension in the conveyor belt 11. This may minimize the displacement of the substrate caused by tension variations. The mounting comprises four mounting parts, each connected to a respective end of the first and second roller, as is described above. All four mounting parts (21, 23, 25, 27) may be independently translated in a transport direction with respect to the frame 15, as is described above. The movement of the mounting parts causes the variations of the tension in the conveyor belt 11 to be cancelled, minimized or compensated, as is described above.

When in this document is referred to the tension in the conveyor belt 11, it may preferably refer to the tension in the conveying part 16 of the conveyor belt 11. Indeed, variations of tension in the conveying part 16 of the conveyor belt may effect the accurate positioning of the object 14 more than variations of the tension in the return part 17. Therefore, it is advantageous to maintain a constant tension in the conveying part 16 of the conveyor belt 11.

It is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Furthermore, the terms and phrases used herein are not intended to be limiting, but rather, to provide an understandable description of the invention. Elements of the above mentioned embodiments may be combined to form other embodiments.

The terms "a" or "an", as used herein, are defined as one or more than one. The term another, as used herein, is defined as at least a second or more. The terms including and/or having, as used herein, are defined as comprising (i.e., not excluding other elements or steps). Any reference signs in the claims should not be construed as limiting the scope of the claims or the invention. The mere fact that certain measures are recited in mutually different dependent claims does not indicate that a combination of these measures cannot be used to advantage. The scope of the invention is only limited by the following claims.

The invention also relates to an assembly according to the invention, wherein at least one of said mounting parts comprises one of the following for providing the tension in the conveyor belt: a resilient material, a spring, a pneumatic cylinder, a counterweight, pneumatic bellows.

The invention claimed is:

1. A positioning and/or transfer assembly comprising:
an endless conveyor belt consisting of a conveying part for carrying an object and a return part;
a first and a second roller arranged inside the endless conveyor belt, each roller having a first and second end;
a frame;
a mounting system comprising a first mounting part mounting the first end of the first roller rotatably to the frame, a second mounting part mounting the second end of the first roller rotatably to the frame, a third mounting part mounting the first end of the second roller rotatably to the frame, and a fourth mounting part mounting the second end of the second roller rotatably to the frame; and
an actuator system for moving the conveyor belt in a lateral direction with respect to the frame, wherein the actuator system comprises a first lateral actuator arranged to move at least a part of the first roller in a direction parallel to the rotational axes of the first roller;
wherein the first roller is longitudinally divided into at least two, such as three or four, longitudinal segments and said first lateral actuator is arranged to move at least one of the longitudinal segments of the first roller parallel to the rotational axis of the first roller with respect to another of said longitudinal segments of the first roller; and
wherein a length direction of the conveyor belt is defined by the conveying direction of the conveyor belt and extends transverse to the rotational axis of the first and second roller; and
wherein at least one of the first and second mounting part comprises a first tensioning system arranged for tensioning the conveyor belt in said length direction for simultaneously counteracting a change of tension in the belt due to laterally moving the at least one of the longitudinal segments of the first roller; and wherein the first and second end of the first roller are moveable relative to each other in said length direction by the first tensioning system in response to a difference in length and/or in belt tension between the longitudinal edges of the conveyor belt; and wherein the actuator system further comprises a second lateral actuator arranged to move at least a part of the second roller in a direction parallel to the rotational axis of the second roller and the second roller is longitudinally divided into at least two, such as three or four, longitudinal segments and said second lateral actuator is arranged to move at least one of the longitudinal segments of the second roller parallel to the rotational axis of the second roller with respect to another of said longitudinal segments of the second roller; and wherein a first end and second end of the second roller are moveable relative to each other in the length direction of the conveyor; and wherein at least one of the longitudinal segments of the first and the second roller is provided with a metal plate at one lateral side of the longitudinal segment and with another metal plate at the other lateral side of the longitudinal segment; and wherein the first and the second lateral actuator comprises at least two controllable magnets, each positioned at one lateral side of the longitudinal segments, wherein the controllable magnets are positioned in front of at least a part of a trajectory of the metal plates, wherein a strength of the magnetic force of the magnets on the metal plates on both lateral sides are controllable such that the longitudinal segment is moved by the magnets in the lateral direction and back.

2. The assembly according to claim 1, further comprising:
a sensor for determining a position of the conveyor belt and for sending a position signal in accordance with the position determined;
wherein the actuator system is arranged for receiving the position signal and for moving the conveyor belt based on the position signal.

3. The assembly according to claim 1, wherein the first tensioning system is arranged to exert a tension to the conveyor belt which is uniform along the length of the first roller.

4. The assembly according to claim 1,
wherein at least one of the third and fourth mounting part comprises a second tensioning system arranged for tensioning the conveyor belt in said length direction for simultaneously counteracting a change of tension in the belt due to laterally moving the at least one of the longitudinal segments of the first roller; and
wherein the third and fourth end of the second roller are moveable relative to each other in said length direction by the second tensioning system in response to a difference in length and/or in belt tension between the longitudinal edges of the conveyor belt.

5. The assembly according to claim 4, wherein the first end of the second roller is, viewed in said length direction, moveable with respect to the frame, and wherein the second end of the first roller is, viewed in said length direction, moveable with respect to the frame.

6. The assembly according to claim 4, wherein the second tensioning system is arranged to exert a tension to the conveyor belt which is uniform along the length of the second roller.

7. The assembly according to claim 1,
wherein the first end of the first roller is, viewed in said length direction, fixed relative to the frame; and
wherein the second end of the first roller is, viewed in said length direction, moveable with respect to the frame.

8. The assembly according to claim 1, wherein the actuator system comprises a vertical actuator to move at least a part of the conveyor belt in a vertical direction transverse to said longitudinal direction and said rotational axis of the rollers.

9. The assembly according to claim 1, wherein the first and second roller are each an end roller, also called return roller.

10. A method for positioning and/or transferring a substrate in a printer comprising:
utilizing the assembly according to claim 1 for positioning and/or transferring a substrate in a printer.

11. A printer for printing on a substrate, comprising an assembly according to claim 1 for positioning and/or transferring a substrate or a printing head of the printer.

12. A line scanner for scanning an object, comprising a positioning assembly according to claim 1 for positioning the object.

* * * * *